(12) United States Patent
Crone et al.

(10) Patent No.: US 7,023,664 B2
(45) Date of Patent: Apr. 4, 2006

(54) AIR BEARING DESIGNS TO REDUCE EXTERNAL VAN DER WAALS AND ELECTROSTATIC FORCES

(75) Inventors: Robert Michael Crone, Faribault, MN (US); Gordon James Smith, Rochester, MN (US); Wing Tsang Tang, Palo Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 375 days.

(21) Appl. No.: 10/242,058

(22) Filed: Sep. 12, 2002

(65) Prior Publication Data

US 2004/0052001 A1 Mar. 18, 2004

(51) Int. Cl.
*G11B 21/21* (2006.01)
*G11B 17/32* (2006.01)
*G11B 5/60* (2006.01)

(52) U.S. Cl. .................................. 360/235.7
(58) Field of Classification Search ............. 360/235.7, 360/236.1, 236.3, 235.6, 235.5; 29/603.11, 29/603.12
See application file for complete search history.

(56) References Cited

U.S. PATENT DOCUMENTS

| | | | | |
|---|---|---|---|---|
| 4,644,641 A | * | 2/1987 | Verdone | ................. 29/603.12 |
| 5,079,657 A | * | 1/1992 | Aronoff et al. | .......... 360/236.6 |
| 5,742,518 A | * | 4/1998 | Gui et al. | ..................... 702/42 |
| 5,940,249 A | * | 8/1999 | Hendriks | ................. 360/235.6 |
| 6,366,429 B1 | | 4/2002 | Stover et al. | |
| 6,381,090 B1 | | 4/2002 | Suzuki et al. | |
| 6,466,410 B1 | * | 10/2002 | Polycarpou et al. | ...... 360/236.6 |
| 6,490,134 B1 | * | 12/2002 | Boutaghou | ............... 360/235.7 |
| 6,510,027 B1 | * | 1/2003 | Chapin et al. | ........... 360/235.8 |
| 6,697,223 B1 | * | 2/2004 | Lewis et al. | ............. 360/235.7 |
| 6,710,976 B1 | * | 3/2004 | Chapin et al. | ........... 360/235.8 |

OTHER PUBLICATIONS

B. Bhushan, "Handbook of Micro/Nano Tribology," CRC Series, Mechanics and Materials Science, pp. 64-69.
C. Denis Mee et al., "Magnetic Recording Technology," McGraw-Hill, 6.27-6.29.
A. Menon, "Interface tribology for 100 Gb/in$^2$," Tribology International 33 (2000), pp. 299-308.
J. Toigo, "Avoiding a Data Crunch," Scientific American, May 2000.

* cited by examiner

*Primary Examiner*—George J. Letscher
*Assistant Examiner*—Christopher R. Magee
(74) *Attorney, Agent, or Firm*—Wood, Herron & Evans, L.L.P.

(57) ABSTRACT

A slider for a disk drive has an air bearing surface that opposes a rotatable disk of recordable media. The air bearing surface includes one or more interior cavities to reduce van der Waals and electrostatic forces that attract the slider to the disk.

22 Claims, 3 Drawing Sheets

AIR BEARING DESIGNS TO REDUCE EXTERNAL VAN DER WAALS AND ELECTROSTATIC FORCES

FIELD OF THE INVENTION

The present invention relates generally to data storage devices, and more particularly to disk drives of the type including a slider having an air bearing surface.

BACKGROUND OF THE INVENTION

A principal part of any computer system is a data storage device. A disk drive is a typical data storage device. A disk drive generally includes at least one disk of magnetic storage material mounted on a motor shaft or spindle, an actuator that locates a read/write head radially over the disk, and circuitry that is used to read and write data from the disk using the read/write head. A disk drive may also include a controller that interfaces with the computer system while controlling the operation of the disk drive.

The read/write head is typically housed in a "slider." A slider has a lower surface known as an air bearing surface that opposes the surface of a disk in use. An air bearing surface typically includes rails that extend generally tangential to the disk, and a recessed portion located between the rails. In operation, the rotation of the disk drags air between the rails creating an increase in pressure that pushes upward on the slider forcing the read/write head away from the disk. At the same time, air moving past the recessed portion causes a decrease in pressure that counteracts the pressure effect of the rails. These pressures equalize to so that the slider flies above the disk at a distance referred to as the "fly height."

The aerial storage density obtainable on a magnetic disk depends directly upon the fly height of the read/write head of a disk drive. Given the ever-present need to increase the storage capacities of disk drives, there is thus a continuous desire to reduce fly heights in order to achieve higher aerial densities.

However, as fly heights are reduced to achieve higher areal densities, external forces such as van der Waals forces, i.e., intermolecular forces that act between electrically neutral molecules, and electrostatic forces exerted on the slider become significant. The presence of metal in the material that the slider is constructed of, e.g., ceramic aluminum titanium carbide (AlTiC), often contributes to the introduction of these forces. At fly heights of a few nanometers, such forces can potentially disrupt the balance of pressures created by an air bearing surface, causing the resulting air bearing to collapse, and allowing the slider to come into contact with the disk.

One approach to reducing the effects of van der Waals and electrostatic forces, and thus allowing a reduction in fly height, is to increase the pitch of the air bearing, so that the lower surface of the slider is not parallel with the disk surface. Another approach is to reduce the size of the trailing edge pads or rails on the air bearing surface. However, both of these approaches require modifying the profile of the air bearing surface, and thus affect the performance of the resulting air bearing. The design of a suitable air bearing surface requires substantial effort, and must accommodate a large number of factors to achieve reliable steady state fly heights of only a few nanometers. Thus, the aforementioned approaches to reducing the effects of external forces introduce additional considerations to the air bearing surface design, and constrain air bearing designers in their ability to manipulate the pressures created by the rails and the recessed portion on the air bearing, thereby impacting the steady state fly height profile.

Therefore, a significant need exists in the art for a slider having an air bearing surface, having a reduced susceptibility to van der Waals and electrostatic forces, and that operates at reduced fly heights without appreciably affecting the steady state fly height profile of the slider or the performance of the air bearing.

SUMMARY OF THE INVENTION

The invention addresses these and other problems associated with the prior art by providing a disk drive, a slider for use therein, and a method that incorporate one or more interior cavities within an air bearing surface of a slider to reduce van der Waals and electrostatic forces between the slider and a rotatable disk of recordable media.

In one embodiment consistent with the invention, the cavities form a pattern of diamond shaped columns in a trailing edge pad. In another embodiment consistent with the present invention, the cavities form a pattern of chevron shaped columns. Irrespective of the design used, by incorporating the cavities into the interior of an air bearing surface, the effects of van der Waals and electrostatic forces may often be reduced without an alteration of the profile of the surface.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there are described exemplary embodiments of the invention.

BRIEF DESCRIPTION OF THE DRAWINGS

The accompanying drawings, which are incorporated in and constitute part of this specification, illustrate embodiments of the invention and, together with a general description of the invention given above and the detailed description given below, serve to explain the principles of the present invention.

DETAILED DESCRIPTION

Figure 1:
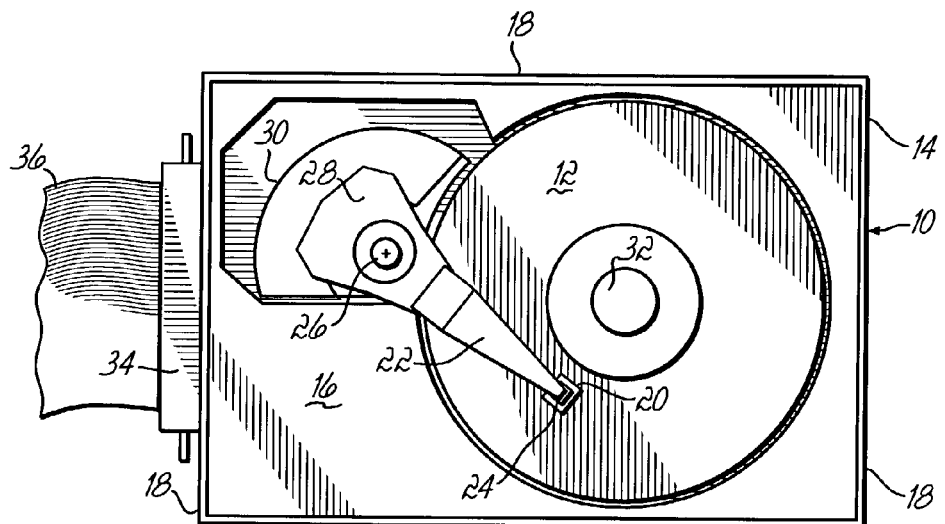
FIG. 1 is an illustration of a sectional view of a disk drive incorporating a slider consistent with the present invention.

Referring to FIG. 1, a sectional view of an embodiment 10 of a disk drive incorporating features of the present invention is shown. Disk drive 10 is a rotary disk drive type using a magnetic disk media 12. The storage capacity of disk drive 10 is, in part, determined by the areal density of data stored on the recordable magnetic media disk 12.

Disk drive 10 comprises a housing 14 to which other components of the disk drive 10 are mounted. Housing 14 may include a bottom 16, sidewalls 18, and a top (not shown). A read/write head 52 (see FIG. 2) is disposed within a slider 20 having an air bearing surface 44 (see FIGS. 2, 4 and 5) and which is coupled proximate the end of an actuator 22 using a gimbal 24. Actuator 22 rotates about a pivot point 26 under the action of a voice coil 28 of a motor 30 to position read/write head 52 over a predetermined track on disk 12. The read/write head 52 within slider 20 interacts with disk 12, which is mounted on a rotating spindle 32 and driven by a motor (not shown). Actuator 22 may also provide a suspension load or bias, positioning read/write head 52 above disk 12. The read/write head 52 within slider 20 is capable of reading and writing data to and from disk 12 using electronics well known to those skilled in the art. Electrical connectivity with the various components within disk drive 10 is available through connector 34 and cable 36.

Figure 2:
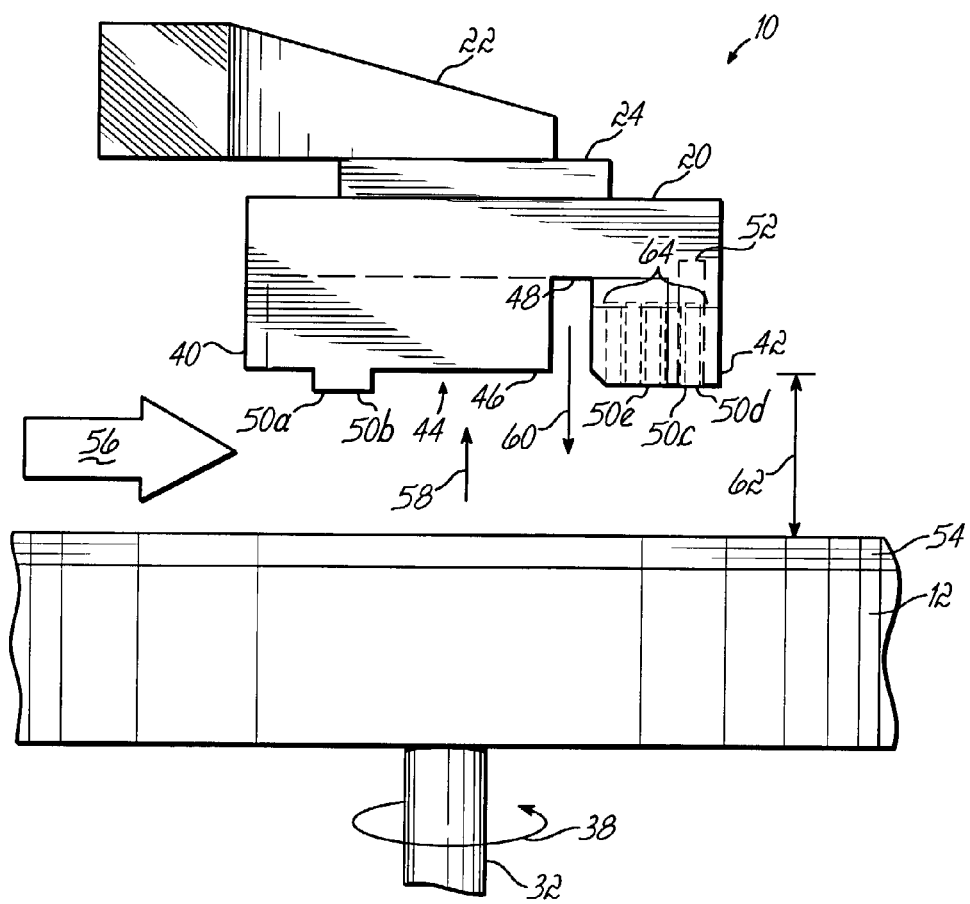
FIG. 2 is a functional side elevation view, not to scale, of the interface between the slider and disk in the disk drive of FIG. 1.

Referring to FIG. 2, a functional side elevation view of the interface between the slider 20 and disk 12 as depicted in FIG. 1 is shown (note that FIG. 2 is not to scale).

Disk drive 10 is illustrated in FIG. 2 in a configuration that occurs when the drive is in operation, as indicated by the position of slider 20 being physically separate from the surface of disk 12 due to the air bearing formed by the interaction of air bearing surface 44 with the surface of disk 12 as disk 12 is rotated in the direction indicated at reference numeral 38.

Slider 20 may be made of a multi-phase material. A multi-phase material refers to the notion that there is more than one component or phase of the material. One suitable multi-phase material is ceramic aluminum titanium carbide ($Al_2O_3$—TiC). Slider 20 may also be made of Ni—Fe, Mn—Zn, and Ni—Zn ferrites, or calcium titaniate. Air bearing surface 44 may be a plasma-sprayed material coating of hard materials such as $Al_2O_3$—$TiO_2$ and $ZrO_2$. Insulation and gap materials may be made from $SiO_2$, SiO, and $Al_2O_3$. Other suitable materials and fabrication processes will be apparent to one of ordinary skill in the art having the benefit of the instant disclosure.

Slider 20 has a leading edge 40 and a trailing edge 42. Intermediate the leading edge 40 and trailing edge 42 is a lower surface or air bearing surface 44. Air bearing surface 44 includes rails 46, a recessed portion 48, and pads 50*a*–*e*. Proximate trailing edge 42 and pads 50*c*–*e* is read/write head 52. In some embodiments, pads 50*a*–*e* may be configured to support slider 20 on disk 12 when the disk is not rotating. In these embodiments, disk 12 may also include a lubricant shown at 54 to reduce friction between the disk 12 and pads 50*a*–*e*. In other embodiments, a load/unload slider that does not rest on a disk may used.

In operation and as illustrated, the rotation 38 of disk 12 drags air, represented by arrow 56, between the rails 46 creating an increase in pressure that pushes upward on the air bearing surface 44 of slider 20, and forcing read/write head 52 away from disk 12, as indicated at reference numeral 58. At the same time, air 56 moving past the recessed portion 48 causes a decrease in pressure, indicated at reference numeral 60, counteracting, to some extent, the pressure effect of the rails 46. These pressures 58, 60, as well as any bias that may be applied by actuator 22, equalize to so that the slider 20 flies above the disk 28 at a desired fly height 62.

It has been found that as the sizes of rails 46, recessed portion 48, and pads 50*a*–*e* are adjusted to further equalize pressures 58 and 60, and thereby reduce the fly height 62 to achieve a higher areal storage density on disk 12, attractive forces between slider 20 and disk 12 can disrupt the balance between the pressures 58, 60 created by the slider 20 air bearing surface 44, causing the air bearing to collapse, i.e., causing the slider 20 to come into contact with the disk 12. Two of the principal forces are van der Waals and electrostatic forces. Such forces increase rapidly below approximately 5 nanometers and may cause an air bearing to collapse below approximately 2 nanometers since attractive forces tend to increase more rapidly than pressure 58.

Van der Waals forces are intermolecular forces that interact between electrically neutral molecules. Electrostatic forces are intermolecular forces that act between positively or negatively charged molecules.

The present invention reduces van der Waals and electrostatic forces between slider 20 and disk 12 by including at least one interior cavity in the slider. Theoretically, the removal of any material from slider 20 reduces the effects of van der Waals and electrostatic forces that attract the slider 20 to the disk 12; however, the removal of material from the exterior surface of the slider or the air bearing surface 44 may affect the performance of the air bearing. Moreover, the removal of material from the exterior surface of the air bearing may create pockets or other structures that allow debris, e.g, dust, lubricant 54, magnetic material, etc., to collect, thereby reducing the etch depth, potentially increasing external forces, and ultimately causing the air bearing to collapse. Such debris may also protrude into a read/write gap resulting in undesirable interactions between a head and a disk. Furthermore, with the formation of certain structures, debris can collect to the point where a drop of debris will fall from a slider, depositing on a disk. When a droplet of debris is deposited on a disk, the next revolution of the disk may cause the droplet of debris to impact a slider. When this impact occurs, slider fly height will vary, i.e., oscillate, preventing reading and writing to a disk.

However, forming a single large cavity can cause problems in certain circumstances. For example, should a single large cavity be formed and debris were to collect lowering the etch depth, such a collection would likely reduce fly height. However, where measures are taken to ensure that a debris would not collect, forming a single large cavity may provide a greater reduction in van der Waals and electrostatic forces attracting the slider to the disk.

Therefore, in light of the forgoing, it may be advantageous to form multiple cavities in a slider, still reducing van der Waals and electrostatic forces between the slider and the disk, while reducing the opportunity for any one cavity to collect debris and significantly impact the performance of the air bearing. It will be appreciated, however, that while the hereinafter described embodiments are shown with multiple interior cavities, the invention may also be implemented using as few as one interior cavity on a slider.

Thus, in the embodiment illustrated in FIG. 2, multiple diamond shaped column cavities 64 are advantageously formed in the trailing edge pad 50*e* of slider 20. By forming multiple cavities internal to the slider, there is little effect on the performance of the air bearing, and in general, the air bearing performs as if the cavities 64 did not exist, as the cavities 64 do not appreciably change the fly height profile. Moreover, slider 20 has reduced susceptibility to debris by including multiple cavities 64.

Figure 3:
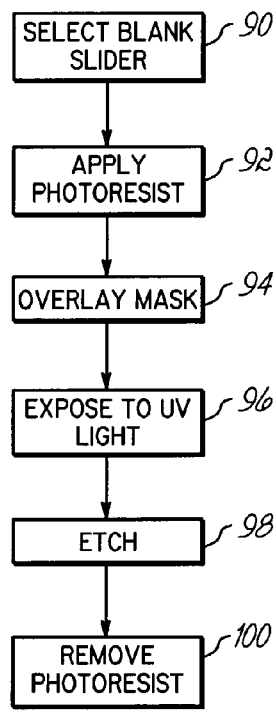
FIG. 3 is a flow diagram illustrating steps in forming a slider with one or more internal cavities in a manner consistent with the invention.

Referring to FIG. 3, a flow diagram illustrating a process for etching a slider with one or more internal cavities and an air bearing surface is illustrated. A "blank slider," or a slider without an air bearing surface, serves as the starting point for formation. A blank slider often includes portions of a read/ write head, such as magnetic gaps. In the course of selecting a blank slider, a slider material is chosen. A blank slider is selected in step 90.

Etching processes are often used to remove material from the blank slider forming the air bearing surface and the internal cavities. Typically, etching processes that remove material are used due to a desire to keep the magnetic gaps of a read/write head already formed in the slider as close as possible to the surface of a disk. Those skilled in the art will appreciate that reactive ion etching (RIE) and/or ion milling (IM) processes may also be used to form an air bearing surface and cavities.

Step 92 shows the application of a photoresist to a slider to form an air bearing surface and/or cavities. Next, in step 94, an overlay mask is applied. In step 96, the slider is expose to ultraviolet (UV) light for a desired amount of time. Step 98 shows etching the slider. Finally, step 100 shows the removal of the photoresist.

Thus, as illustrated in FIG. 3, the formation of internal cavities in a slider may require an one or more masking steps during slider fabrication. Moreover, etching processes may be used to form recessed portions, such as recessed portion 48, during a deep etch process by increasing the time an a photoresist applied to a slider is exposed to UV light. Those skilled in the art will appreciate that alternate processes may also be used.

Figure 4:
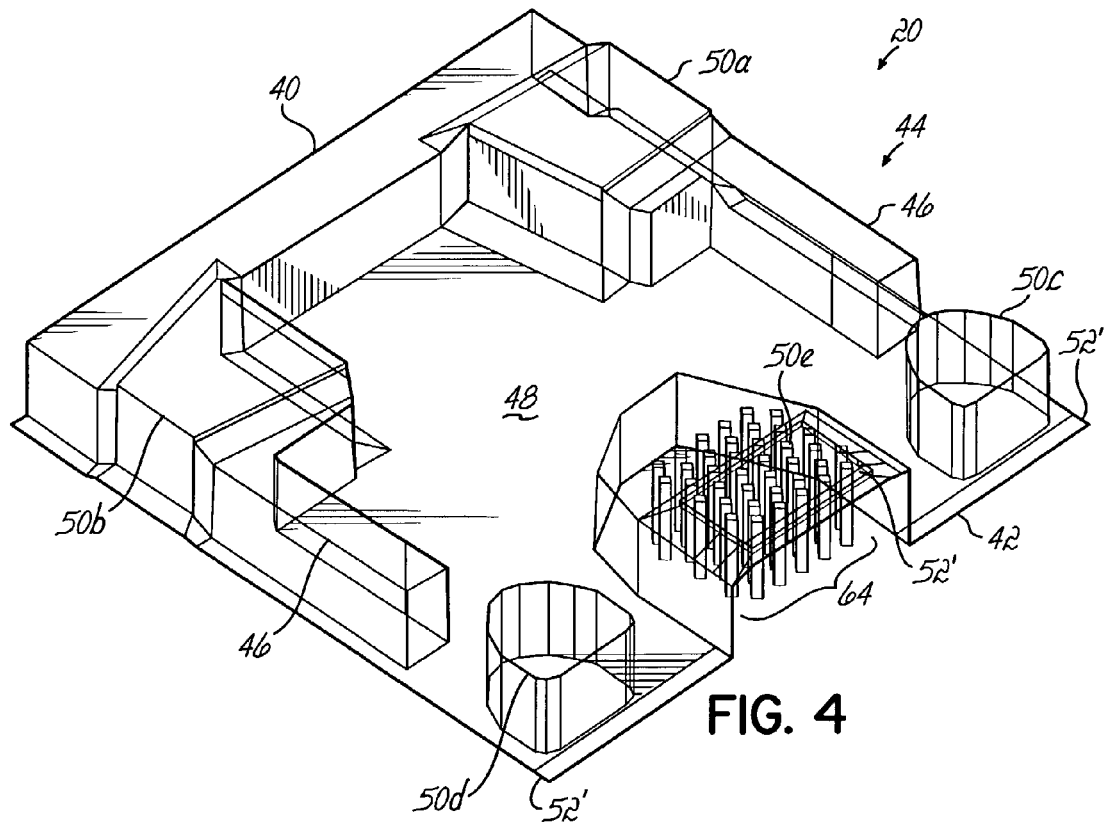
FIG. 4 is a perspective wireframe view of the slider air bearing surface shown in FIG. 2.

Referring to FIG. 4, a perspective wireframe view of air bearing surface 44 of slider 20 shown in FIG. 2 and formed using the steps of FIG. 3 is illustrated. The material slider 20 is constructed of is shown as transparent, the lines of the drawing indicating the edges of the structures on the air bearing surface, so as to further illustrate features of the invention. Reference numeral 52' indicates the approximate location of the gap of read/write head 52 shown in FIG. 2.

The present invention reduces attractive forces between the slider 20 and disk 12 by forming cavities using etching in the trailing edge pad 50e internal to the pad 50e, as shown at reference numeral 64. The cavities 64 formed are a pattern of diamond shaped columns.

Figure 5:
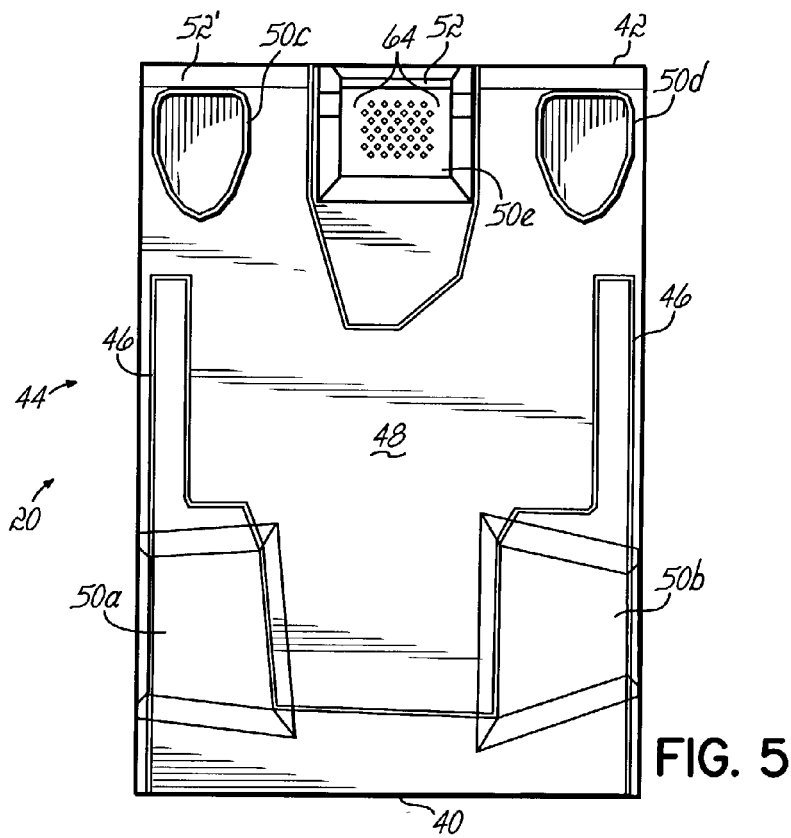
FIG. 5 is a plan view of the slider air bearing surface shown in FIGS. 2 and 4.

Referring to FIG. 5, a plan view of the air bearing surface 44 of slider 20 shown in FIGS. 1–2 and 4 is illustrated. The material slider 20 is constructed of is shown as transparent to further illustrate features of the invention. FIG. 4 more fully illustrates the pattern of diamond shaped cavities 64 formed in trailing edge pad 50e. Pad 50e is selected in this embodiment as pad 50e is the closest to disk 12, thus having a significant impact in reducing van der Waals and electrostatic forces. Those skilled in the art will appreciate that such a pattern of cavities 64 may be formed using an additional masking step during slider 20 fabrication.

Those skilled in the art will also appreciate that cavities may formed in other portions of slider 20, such as pads 50a–d, to further reduce forces that attract slider 20 to disk 12. Cavities may also be formed in rails 46. Therefore, the present invention is not limited to forming cavities in trailing edge pad 50e, but rather, applies generally to forming cavities in a slider to reduce forces that attract a slider to a disk.

Figure 6:
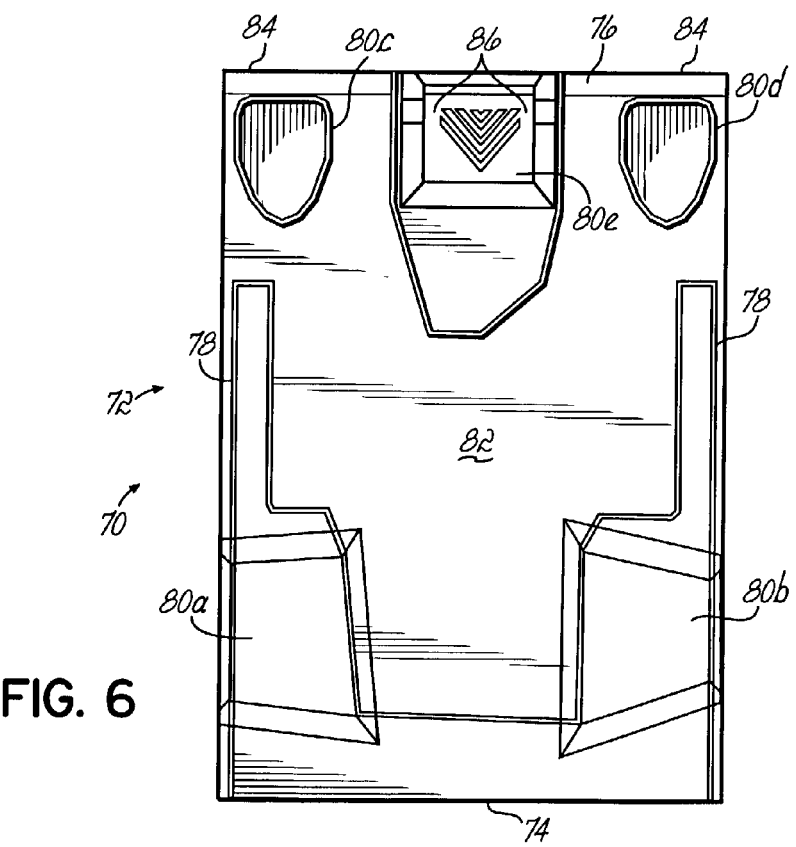
FIG. 6 is a plan view of an alternate air bearing surface to that of FIGS. 4 and 5.

FIG. 6 shows a plan view of an air bearing surface 70 of another slider 72 consistent with the invention. Slider 72 includes a leading edge 74 and a trailing edge 76. Air bearing surface 70 comprises rails and pad 78, 80a–e. Intermediate leading and trailing edges 74, 76 and rails and pads 78, 80a–e is a recessed region 82. Slider 72 includes a read/write gap 84 associated with a read/write head (not shown).

Slider 72 includes a pattern of chevron shaped columns 86 formed in pad 84e to reduce the attractive forces, e.g., van der Waals and electrostatic forces, between slider 72 and a disk. Those skilled in the art will appreciate that cavites could also be formed in pads 80a–d and/or rails 78 to further reduce van der Waals and electrostatic forces. Practically any pattern of cavities, arranged in two-dimensional or three-dimensional patterns may be used. Moreover, any manner of forming cavities, incorporating additive and/or subtractive processes may be used.

By virtue of the foregoing there is thus provided a slider having an air bearing surface, with reduced susceptibility to van der Waals and electrostatic forces, that operates at reduced fly heights without appreciably affecting the steady state fly height profile of the slider or the performance of the air bearing.

While the invention has been illustrated by the description of the embodiments thereof, and while the embodiments have been described in considerable detail, it is not the intention of applicant to restrict or in any way limit the scope of the appended claims to such detail. Additional advantages and modification will readily appear to those skilled in the art. It will be understood that principles of the present invention may be applied to practically any existing air bearing design and would generally not significantly impact fly height performance, i.e., no redesign would typically be required. The invention in its broader aspects is therefore not limited to the specific details, representative apparatus and method, and illustrative examples shown and described. Accordingly, departure may be made from such details without departing from the spirit or scope of applicants' general inventive concept.

What is claimed is:

1. A disk drive comprising:
(a) a rotatable disk of recordable media; and,
(b) an actuator extending along a surface of the disk, the actuator including a slider mounted proximate the end of the actuator, the slider including an air bearing surface facing the surface of the disk, the slider having at least one interior cavity disposed therein to reduce van der Waals and electrostatic forces that attract the slider to the disk, the interior cavity defining a chevron shaped column having a vertex facing a leading edge of the slider, wherein the slider has multiple cavities, wherein the slider includes a trailing edge pad and wherein the cavities are formed in the trailing edge pad.

2. The disk drive of claim 1, wherein the cavities include a plurality of cavities forming a pattern of diamond shaped columns.

3. The disk drive of claim 1, wherein the cavities form a pattern of chevron shaped columns.

4. The disk drive of claim 1, wherein the slider includes a plurality of pads and wherein the cavities are formed in the plurality of pads.

5. The disk drive of claim 1, wherein the slider includes rails and wherein the cavities are formed in the rails.

6. The disk drive of claim 1, wherein the slider includes rails and pads and wherein the cavities are formed in the rails and the pads.

7. A slider configured to house a head capable of interaction with a disk of magnetic storage media, the slider comprising:
(a) an air bearing surface; and
(b) at least one interior cavity disposed within the slider to reduce van der Waals and electrostatic forces that attract the slider to the disk, the at least one interior cavity comprising first and second chevron shaped cavities, each chevron shaped cavity including first and second legs joined at a vertex, wherein the first and second cavities are nested such that the vertex of the second cavity is disposed intermediate the first and second legs of the first cavity.

8. The slider of claim 7, wherein the slider has at least three cavities.

9. The slider of claim 8, wherein the slider includes a trailing edge pad and wherein the cavities are formed in the trading edge pad.

10. The slider of claim 9, wherein the cavities include a plurality of cavities forming a pattern of diamond shaped columns.

11. The slider of claim 9, wherein the cavities form a pattern of chevron shaped columns.

12. The slider of claim 8, wherein the slider includes a plurality of pads and wherein the cavities are formed in the plurality of pads.

13. The slider of claim 8, wherein the slider includes rails and wherein the cavities are formed in the rails.

14. The disk drive of claim 8, wherein the slider includes rails and pads and wherein the cavities are formed in the rails and the pads.

15. A method of manufacturing a slider, comprising the steps of:
   (a) forming an air bearing surface on the slider, the air bearing surface including a pair of rails and a trailing edge pad disposed intermediate the pair of rails and along a longitudinal centerline of the slider; and
   (b) forming at least one internal cavity in the trailing edge pad of the slider to reduce van der Waals and electrostatic forces that attract the slider to a disk, wherein the internal cavity is disposed and arranged such that a steady state fly height profile of the slider is substantially unaffected by the internal cavity.

16. The method of claim 15, wherein forming at least one internal cavity comprises forming multiple interior cavities in the slider.

17. The method of claim 16, wherein the pair of rails are substantially free of internal cavities.

18. The method of claim 17, wherein forming multiple cavities in one slider comprises forming cavities in a pattern of diamond shaped columns.

19. The method of claim 17, wherein forming multiple cavities in one slider comprises forming cavities in a pattern of chevron shaped columns.

20. The method of claim 16, further comprising forming a plurality of pads, wherein forming multiple cavities in one slider comprises forming cavities in the plurality of pads.

21. The method of claim 16, wherein forming multiple cavities in the slider comprises forming cavities in the rails.

22. The method of claim 16, further comprising forming a plurality of pads, wherein forming multiple cavities in one slider comprises forming cavities in the rails and the pads.

* * * * *

UNITED STATES PATENT AND TRADEMARK OFFICE
CERTIFICATE OF CORRECTION

PATENT NO. : 7,023,664 B2  Page 1 of 1
APPLICATION NO. : 10/242058
DATED : April 4, 2006
INVENTOR(S) : Robert Michael Crone, Gordon James Smith and Wing Tsang Tang It is certified that error appears in the above-identified patent and that said Letters Patent is hereby corrected as shown below:

Column 1
line 32, between the words "equalize" and "so", delete the word "to".

Column 3
line 50, after the word "may", insert the word --be--.
line 61, between the words "equalize" and "so", delete the word "to".

Column 5
line 16, change the word "expose" to --exposed--.
line 20, after the word "require", delete the word "an".
line 23, after the word "time", delete the word "an".
line 52, after the word "may", insert the word --be--.

Column 8
line 10, change the word "are" to --is--.

Signed and Sealed this

Fourth Day of September, 2007

JON W. DUDAS
*Director of the United States Patent and Trademark Office*